United States Patent
LoRicco

(10) Patent No.: US 10,724,381 B2
(45) Date of Patent: Jul. 28, 2020

(54) COOLING PASSAGE WITH STRUCTURAL RIB AND FILM COOLING SLOT

(71) Applicant: United Technologies Corporation, Farmington, CT (US)

(72) Inventor: Nicholas M. LoRicco, Windsor, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 144 days.

(21) Appl. No.: 15/912,906

(22) Filed: Mar. 6, 2018

(65) Prior Publication Data

US 2019/0277144 A1  Sep. 12, 2019

(51) Int. Cl.
| | |
|---|---|
| F01D 5/18 | (2006.01) |
| F01D 11/08 | (2006.01) |
| F01D 25/12 | (2006.01) |
| F01D 9/04 | (2006.01) |

(52) U.S. Cl.
CPC .............. *F01D 5/186* (2013.01); *F01D 9/041* (2013.01); *F01D 11/08* (2013.01); *F01D 25/12* (2013.01); *F05D 2220/323* (2013.01); *F05D 2240/11* (2013.01); *F05D 2240/12* (2013.01); *F05D 2240/30* (2013.01); *F05D 2250/52* (2013.01); *F05D 2250/70* (2013.01); *F05D 2260/202* (2013.01); *F05D 2260/204* (2013.01); *F05D 2260/22141* (2013.01)

(58) Field of Classification Search
CPC ......... F05D 2260/202; F05D 2260/204; F01D 5/186
See application file for complete search history.

(56) References Cited

U.S. PATENT DOCUMENTS

| | | | | |
|---|---|---|---|---|
| 5,405,242 A | * | 4/1995 | Auxier | B23P 15/04 415/115 |
| 6,402,470 B1 | * | 6/2002 | Kvasnak | F01D 5/187 415/115 |
| 6,616,406 B2 | * | 9/2003 | Liang | F01D 5/186 416/97 R |
| 7,011,502 B2 | | 3/2006 | Lee et al. | |
| 7,255,534 B2 | * | 8/2007 | Liang | F01D 5/14 415/115 |

(Continued)

FOREIGN PATENT DOCUMENTS

| | | |
|---|---|---|
| EP | 2374996 A2 | 10/2011 |
| EP | 3034794 A1 | 6/2016 |

(Continued)

OTHER PUBLICATIONS

European Search Report Issued in EP Application No. 19160979.1, dated Jul. 10, 2019, 9 pages.

*Primary Examiner* — Ninh H. Nguyen
(74) *Attorney, Agent, or Firm* — Cantor Colburn LLP

(57) ABSTRACT

A component for a gas turbine engine, includes a component outer surface exposed to flowpath gases of the gas turbine engine, a cooling channel located in the component, and at least one channel rib located in the cooling channel extending across the cooling channel from a channel inner surface to a channel outer surface. A cooling slot extends from the cooling channel to a slot outlet at the component outer surface. The slot outlet has a radial width greater than an axial length.

20 Claims, 5 Drawing Sheets

(56) References Cited

U.S. PATENT DOCUMENTS

| | | | |
|---|---|---|---|
| 8,317,475 | B1 | 11/2012 | Downs |
| 8,714,926 | B2 | 5/2014 | Lee et al. |
| 2005/0118023 | A1 | 6/2005 | Bunker et al. |
| 2006/0222497 | A1* | 10/2006 | Lee .................. F01D 5/186 416/97 R |

FOREIGN PATENT DOCUMENTS

| | | |
|---|---|---|
| EP | 3124745 A1 | 2/2017 |
| WO | 2017188991 A1 | 11/2017 |

* cited by examiner

COOLING PASSAGE WITH STRUCTURAL RIB AND FILM COOLING SLOT

BACKGROUND

Exemplary embodiments pertain to the art of gas turbine engines, and more particularly to cooling of components of gas turbine engines.

Advancements in performance of turbomachines, such as gas turbine engines, performance has often been linked to overall pressure ratio of the turbomachine and a turbine inlet temperature that can be sustained during operation of the turbomachine. Increases in efficiency through increases in pressure ratio and/or turbine inlet temperature typically results in an increase in operating temperatures of turbine flow path components, in which temperatures of the working fluid in the turbine flow path is often several hundred degrees Fahrenheit higher than the melting point of component materials.

Components such as turbine vanes and blades and blade outer air seals, in the turbine section of the gas turbine engine are configured for use within particular temperature ranges. Often, the conditions in which the components are operated exceed a maximum useful temperature of the material of which the components are formed. Thus, such components often rely on cooling airflow to cool the components during operation. For example, stationary turbine vanes often have internal passages for cooling airflow to flow through, and additionally may have openings in an outer surface of the vane for cooling airflow to exit the interior of the vane structure and form a cooling film of air over the outer surface to provide the necessary thermal conditioning. Similar internal cooling passages are often included in other components, such as the aforementioned turbine blades and blade outer air seals.

Passages of various configurations have been used traditionally to cool turbine components. In the ongoing efforts to improve engine performance and efficiency, these configurations are becoming increasingly inadequate to provide sufficient cooling for the constituent materials. In these applications, dual-wall cooling may be utilized. These dual-wall passages are formed by thin 'skin cores' which provide a narrow cavity in the thickness direction between the main body core passage and the external hot gaspath wall. These passages may extend in any direction along the surface of the hot section component, which may be a blade, vane, outer air seal, combustor panel, or any other cooled component.

BRIEF DESCRIPTION

In one embodiment, a component for a gas turbine engine, includes a component outer surface exposed to flowpath gases of the gas turbine engine, a cooling channel located in the component, and at least one channel rib located in the cooling channel extending across the cooling channel from a channel inner surface to a channel outer surface. A cooling slot extends from the cooling channel to a slot outlet at the component outer surface. The slot outlet has a radial width greater than an axial length.

Additionally or alternatively, in this or other embodiments a slot teardrop extends across the cooling slot from a slot inner surface to a slot outer surface.

Additionally or alternatively, in this or other embodiments two or more cooling channels are located in the component.

Additionally or alternatively, in this or other embodiments the slot outlet radial width spans the two or more cooling channels.

Additionally or alternatively, in this or other embodiments two or more channel ribs are located in the component.

Additionally or alternatively, in this or other embodiments the slot outlet radial width spans the two of more channel ribs.

Additionally or alternatively, in this or other embodiments the component is one of a turbine vane, a turbine blade or a blade outer air seal.

Additionally or alternatively, in this or other embodiments the cooling channel is a skin cooling flow passage.

In another embodiment, a turbine vane for a gas turbine engine includes a vane outer surface exposed to flowpath gases of the gas turbine engine, a cooling channel disposed in the turbine vane and at least one channel rib located in the cooling channel extending across the cooling channel from a channel inner surface to a channel outer surface. A cooling slot extends from the cooling channel to a slot outlet at the component outer surface. The slot outlet has a radial width greater than an axial length.

Additionally or alternatively, in this or other embodiments a slot teardrop extends across the cooling slot from a slot inner surface to a slot outer surface.

Additionally or alternatively, in this or other embodiments two or more cooling channels are located in the turbine vane.

Additionally or alternatively, in this or other embodiments the slot outlet radial width spans the two or more cooling channels.

Additionally or alternatively, in this or other embodiments two or more channel ribs are located in the turbine vane.

Additionally or alternatively, in this or other embodiments the slot outlet radial width spans the two of more channel ribs.

Additionally or alternatively, in this or other embodiments the cooling channel is a skin cooling flow passage In yet another embodiment, a gas turbine engine includes a combustor section, and a turbine section in flow communication with the combustor section. One of the turbine section and the combustor section includes a component including a component outer surface exposed to flowpath gases of the gas turbine engine, a cooling channel located in the component, and at least one channel rib located in the cooling channel extending across the cooling channel from a channel inner surface to a channel outer surface. A cooling slot extends from the cooling channel to a slot outlet at the component outer surface. The slot outlet has a radial width greater than an axial length.

Additionally or alternatively, in this or other embodiments the component further comprises a slot teardrop extending across the cooling slot from a slot inner surface to a slot outer surface.

Additionally or alternatively, in this or other embodiments two or more cooling channels are located in the component.

Additionally or alternatively, in this or other embodiments the slot outlet radial width spans the two or more cooling channels.

Additionally or alternatively, in this or other embodiments two or more channel ribs are located in the component.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
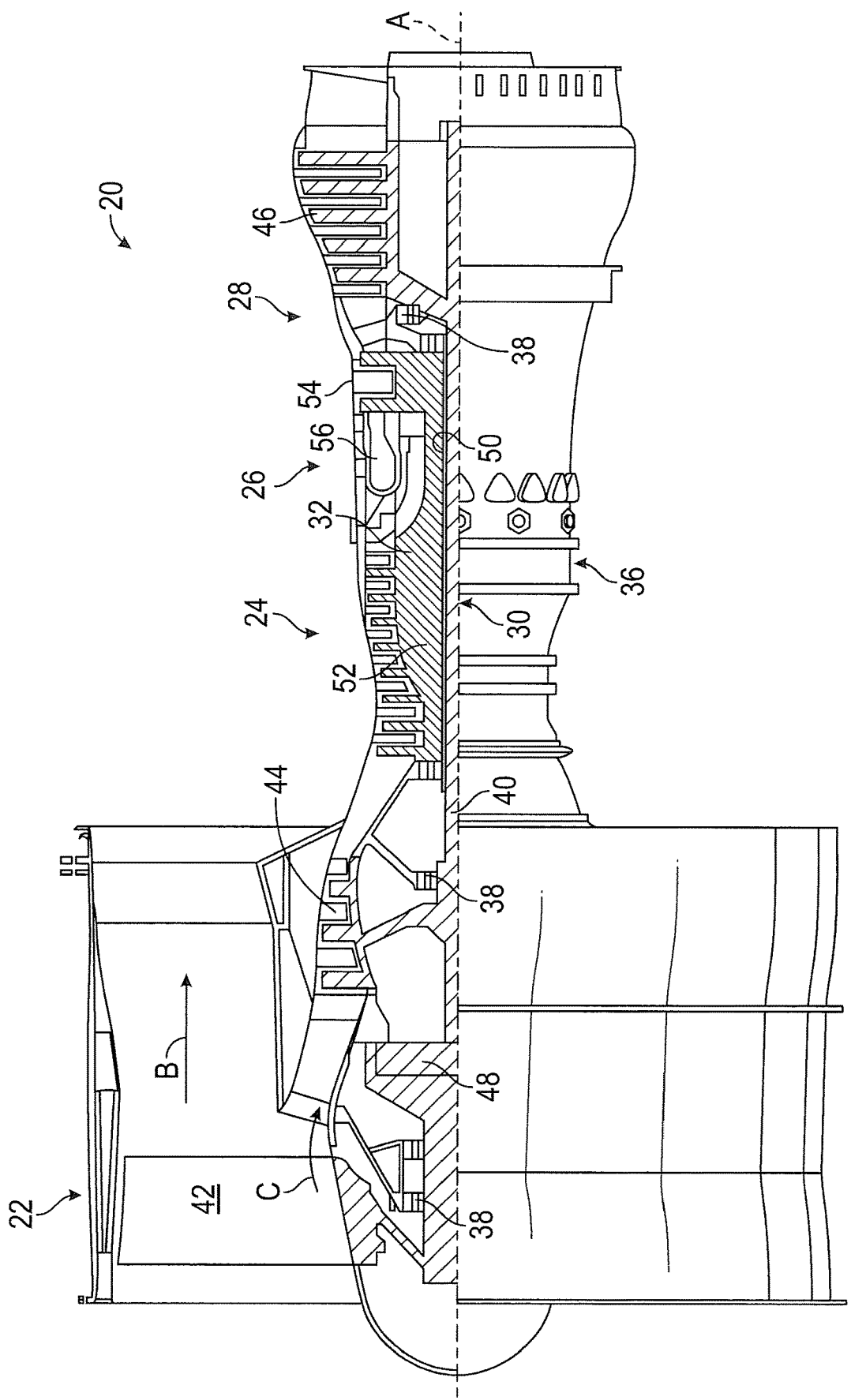
FIG. 1 is a cross-sectional view of an embodiment of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R.)/(518.7°\ R.]^{0.5}$. The "Low corrected fan tip speed" as disclosed herein according to one non-limiting embodiment is less than about 1150 ft/second (350.5 m/sec).

Figure 2:
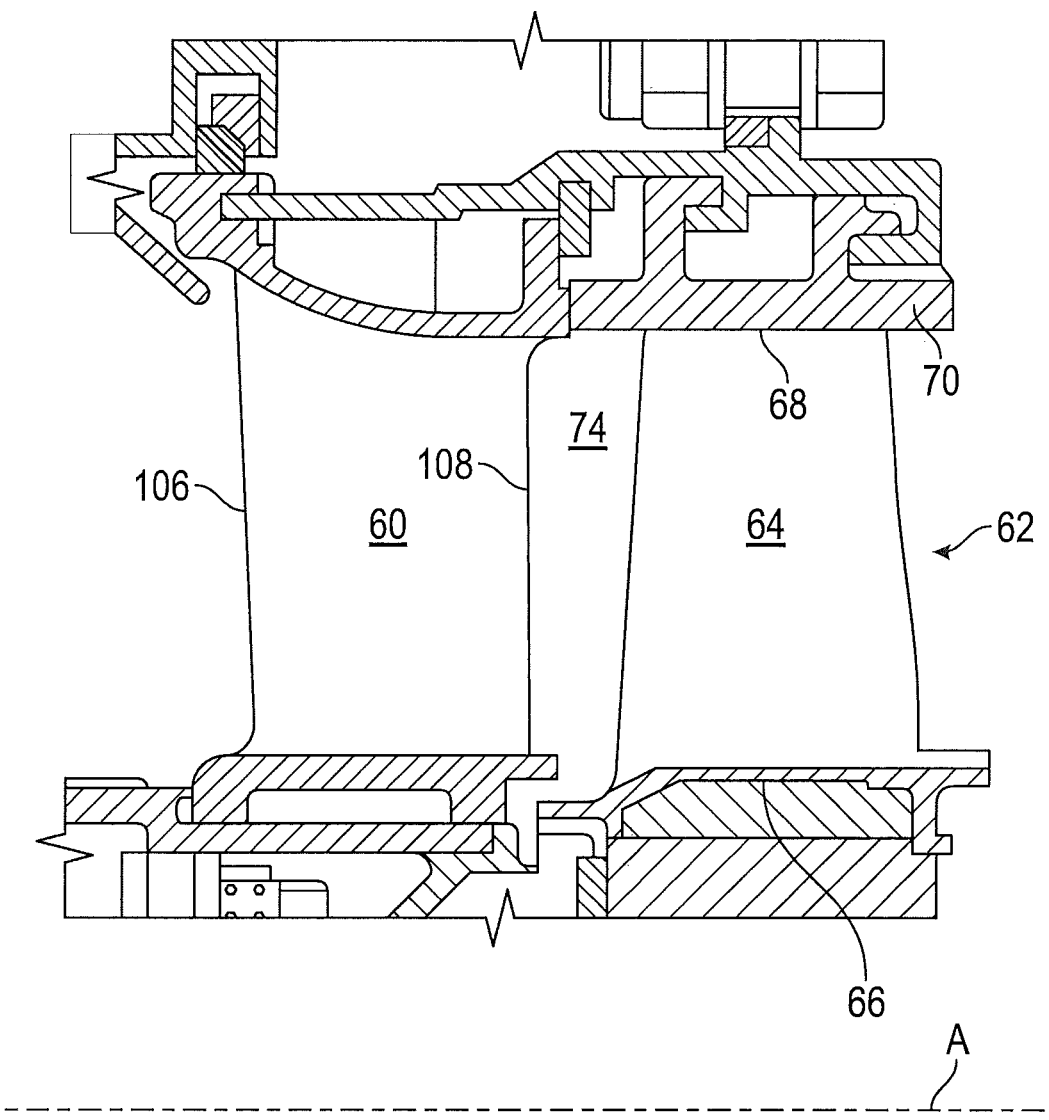
FIG. 2 is a cross-sectional view of an embodiment of a turbine section of a gas turbine engine.

Referring now to FIG. 2, the turbine section 28 includes one or more sets, or stages of fixed turbine vanes 60 and turbine rotors 62, each turbine rotor 62 including a plurality of turbine blades 64. The turbine blades 64 extend from a blade platform 66 radially outwardly to a blade tip 68. The blade tip 68 interfaces with a blade outer airseal 70 to maintain minimal operational clearances and thus operational efficiency of the turbine 28. The turbine vanes 60 and the turbine blades 64 utilize internal cooling passages through which a cooling airflow is circulated to maintain the turbine blades 64 and turbine vanes 60 within a desired temperature range. Similarly, other components such as the blade outer airseal 70 may utilize similar cooling passages over which cooling airflow is directed to maintain the component at a desired temperature range, to improve the service life of the component. Further, while internal cooling passages are described herein in the context of turbine vanes 60, it is to be appreciated that the present disclosure may be similarly applied to turbine blades 64, blade outer airseal 70, and other components of the gas turbine engine 20, such as other components of the turbine section 28 or the compressor section 24.

Figure 3A:
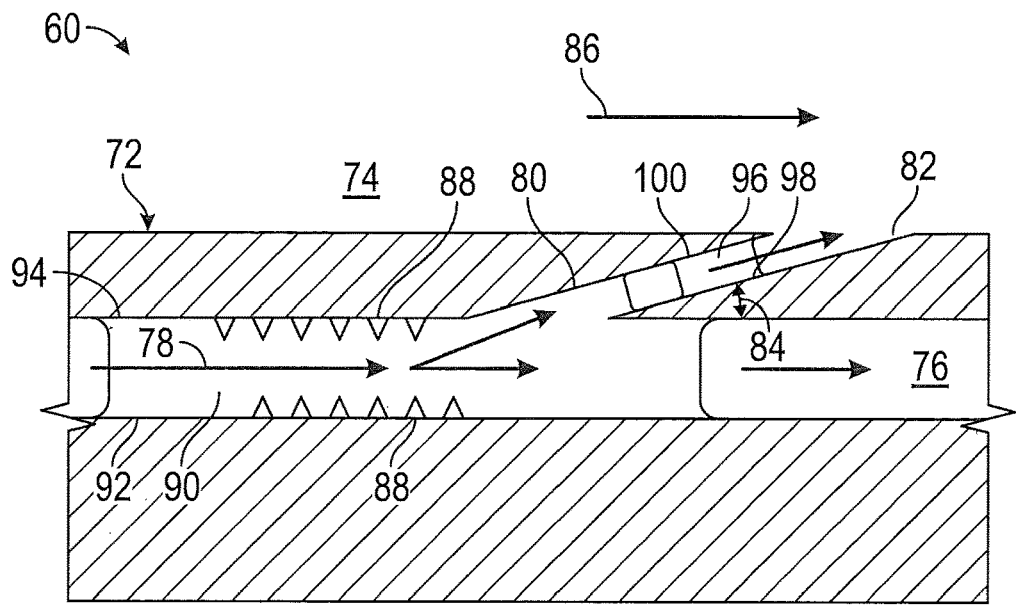
FIG. 3A is a cross-sectional view of an embodiment of a turbine vane for a gas turbine engine.

FIG. 3A is a partial cross-sectional view of a turbine vane 60. The turbine vane 60 includes a flowpath surface 72 exposed to a hot gaspath 74 of the turbine section 24. One or more cooling flow channels 76 are located in an interior of the turbine vane 60 to convey a cooling airflow 78 therethrough. In some embodiments, the cooling airflow 78 is conveyed from a lower temperature portion of the gas turbine engine 20, such as the compressor section 24 in the form of compressor bleed airflow. The cooling flow channel 76 is connected to the hot gaspath 74 via a cooling slot 80 extending from the cooling flow channel 76 to a slot exit 82 at the flowpath surface 72. In some embodiments, the cooling slot 80 extends from the cooling flow channel 76 at a branch angle 84 between 0 and 90 degrees relative to a direction of cooling airflow 78 along the cooling flow channel 76. At least a portion of the cooling airflow 78 flows from the cooling flow channel 76 through the cooling slot 80 and through the slot exit 82 to cool the flowpath surface 72 by, for example, forming a cooling film in the hot gaspath 74 to protect the flowpath surface 72 from gaspath airflow 86. In some embodiments, the cooling flow channel 76 includes trips, pedestals, or other turbulence-inducing features 88 arrayed along the cooling flow channel 76. The features 88 induce turbulence in the cooling airflow 78 to increase the cooling effects of the cooling airflow 78. One or more channel ribs 90 are located in the cooling flow channel 76 from an inner channel wall 92 to an outer channel wall 94, opposite the inner channel wall 92. The channel ribs 90 are configured to provide structural support for the turbine vane 60 along the cooling flow channel 76, while allowing sufficient cooling airflow 78 to flow through the cooling flow channel 76. Further, in some embodiments the cooling slot 80 includes a slot teardrop 96 extending across the cooling slot 80 from an inner slot wall 98 to an outer slot wall 100. The slot teardrops 96 are configured to provide structural support for the turbine vane 60 along the cooling slot 80, while allowing sufficient cooling airflow 78 to flow through the cooling slot 80.

Figure 3B:
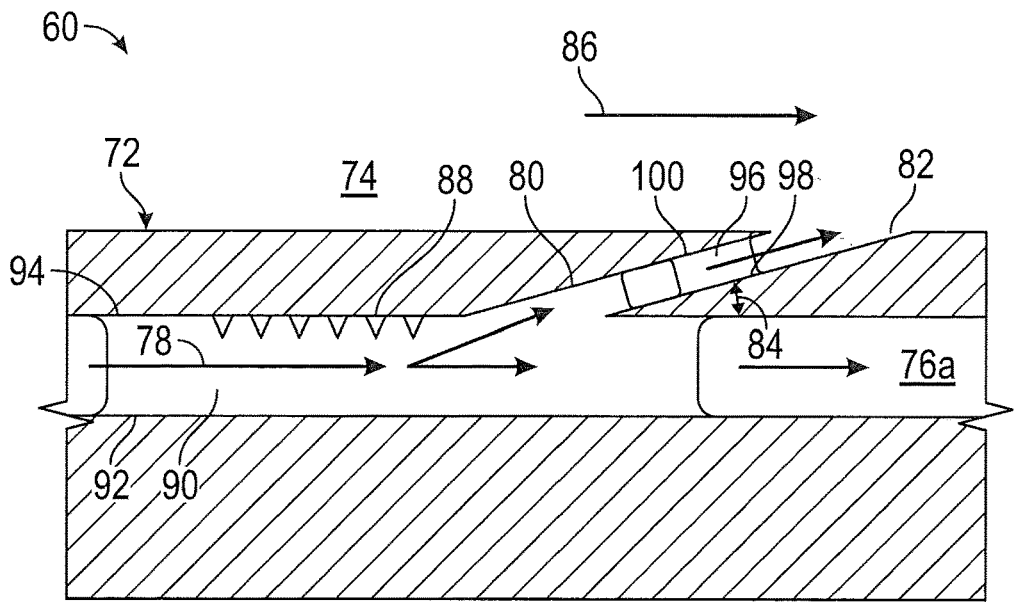
FIG. 3B is another cross-section view of an embodiment of a turbine vane for a gas turbine engine.
Figure 3B:
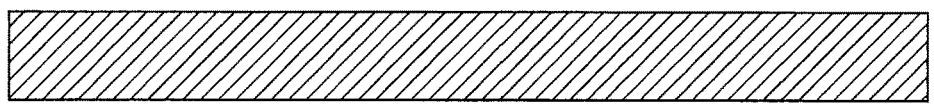

In another embodiment, FIG. 3B represents a turbine vane 60 where cooling flow channel is a skin core cooling passage 76a. The skin core cooling passage 76a is formed between the flowpath surface 72 and a main body supply cavity 104. The main body supply cavity 104 is thin in the direction normal to the flowpath surface 72, enabling higher heat transfer than traditional cooling passages. In this embodiment, the turbulence-inducing features 88 are included only on the outer channel wall 94 as it operates significantly hotter than the inner channel wall 92 which does not require cooling.

Figure 3C:
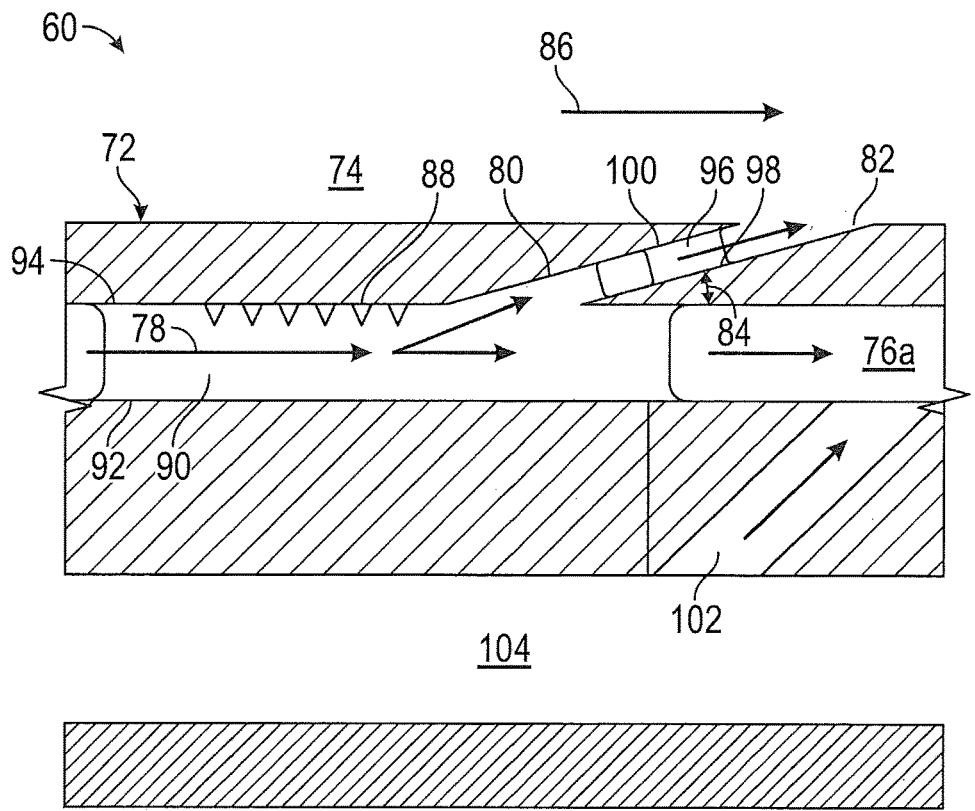
FIG. 3C is another cross-section view of an embodiment of a turbine vane for a gas turbine engine.

In another embodiment, FIG. 3C illustrates a turbine vane 60 including a resupply channel 102, which connects the skin core cooling passage 76a to the main body supply cavity 104, or other internal supply cavity. As cooling air travels through the skin cooling flow passage 76a, the static pressure of the cooling air is reduced, and its bulk average temperature increases as heat is removed from the outer channel wall 94. This pressure drop creates a positive pressure gradient between the cooling air contained in the main body supply cavity 104 and the skin cooling flow passage 76a, forcing cooling into the skin cooling flow passage 76a effectively providing a 'resupply', which increases the coolant pressure in the skin cooling flow passage 76a while reducing the temperature. The resupply channel 102 may be oriented along the flow direction of skin cooling flow passage 76a as to minimize mixing losses in the skin cooling flow passage 76a when the two sources of flow meet.

Figure 4:
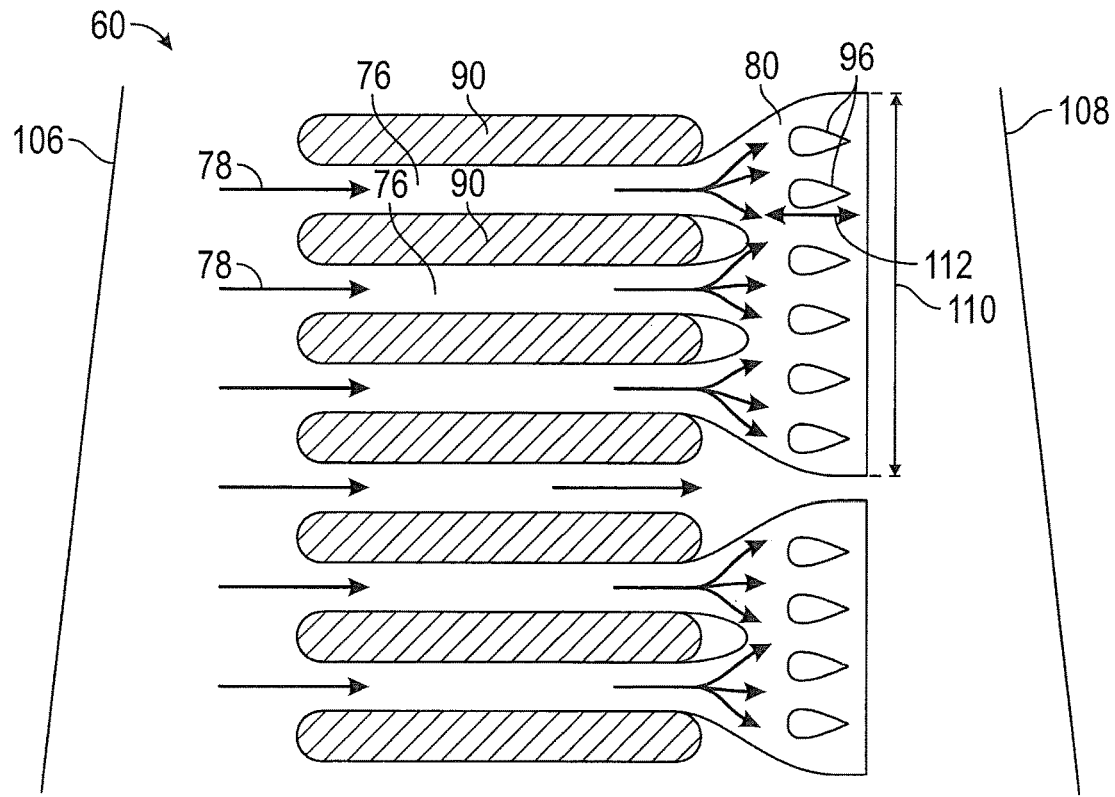
FIG. 4 is another cross-sectional view of an embodiment of a turbine vane for a gas turbine engine.

Referring now to FIG. 4, in some embodiments a plurality of channel ribs 90 are arrayed in the turbine vane 60. In the embodiment of FIG. 4, the channel ribs 90 extend between a vane leading edge 106 and a vane trailing edge 108 in a substantially axial direction, relative to the engine central longitudinal axis A, and may further be arranged such that adjacent channel ribs 90 are arranged parallel to one another. It is to be appreciated, however, that in other embodiments other arrangements of channel ribs 90 may be utilized.

Figure 5:
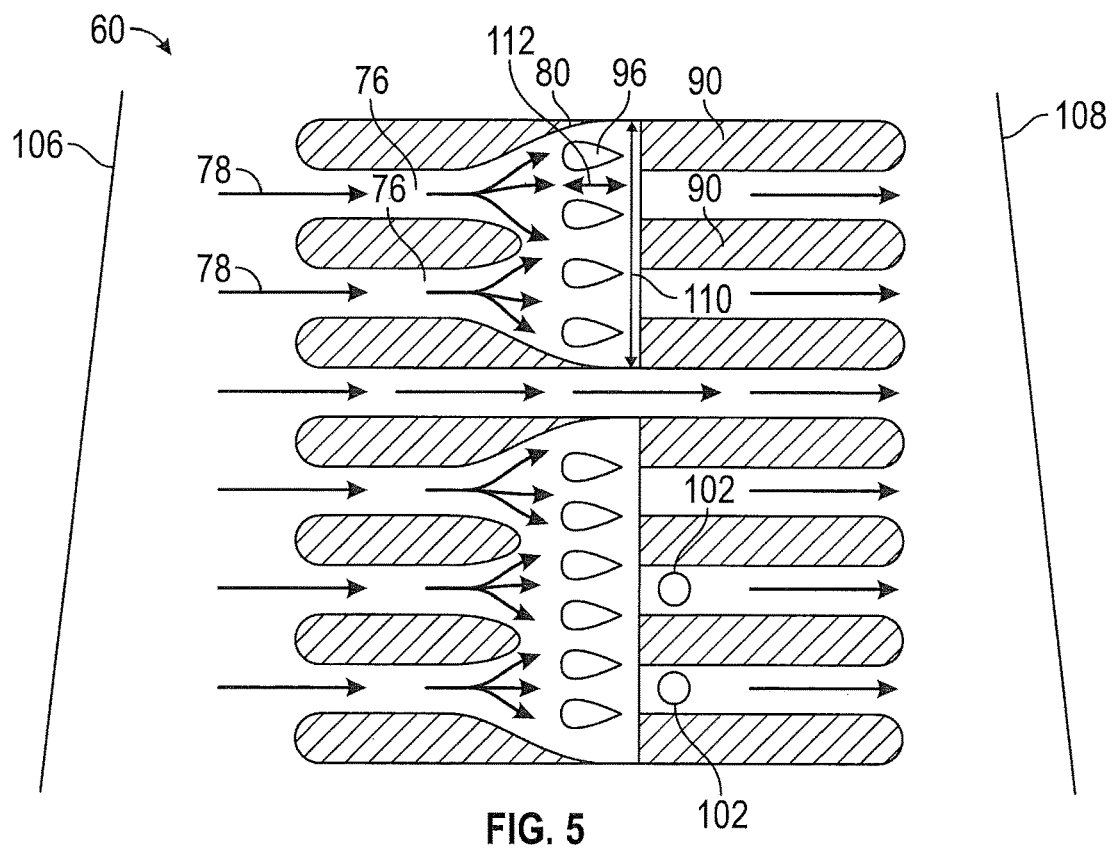
FIG. 5 is yet another cross-sectional view of an embodiment of a turbine vane for a gas turbine engine.

In the embodiment of FIG. 4, the cooling slot 80 has an aspect ratio of radial width 110 to axial length 112 of greater than one. The cooling slot 80 extends across more than one cooling flow channel 76, and includes a plurality of slot teardrops 96 arranged across the cooling slot 80. Such a configuration allows for good distribution of the cooling airflow 78 across the flowpath surface. Another embodiment is illustrated in FIG. 5, in which the cooling slots 80 extend across multiple channel ribs 90. Such a configuration may include resupply holes 102 to restore pressure in the cavity passage and reduce coolant temperatures.

The use of the channel ribs 90 provides the structural support to the turbine vane 60 allowing for the cooling slot 80 with radial width 110 greater than axial length 112 to allow the cooling airflow 78 to be more evenly distributed over the flowpath surface 72 to enhance the film cooling.

Figure 6:
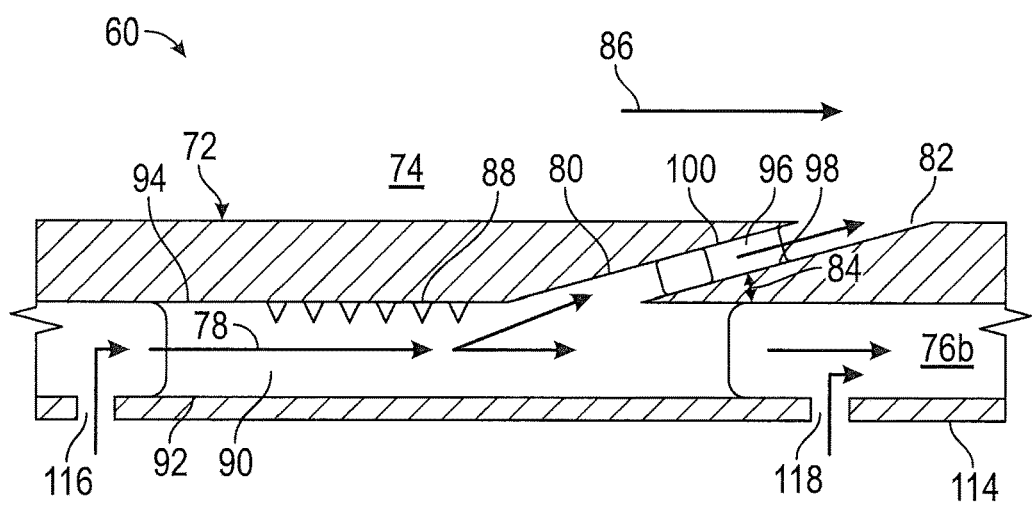
FIG. 6 is still another cross-sectional view of an embodiment of a turbine vane for a gas turbine engine.

FIG. 6 depicts a skin cooling flow passage 76b formed via a sheet metal baffle insert 114 as opposed to a cast-in dual wall configuration. The internal main body supply cavity 104a is also formed by baffle insert 114. Air enters the skin cooling flow passage 76b through holes in the baffle wall 116, providing the main source of cooling air to the cooling slot 80 and to the downstream portion of skin cooling flow passage 76b. A resupply hole 118 in the baffle insert 106 downstream of cooling slot 80, may be included in applications where significant pressure drop or heat up occurs in the coolant. This resupply feature improves the cooling effectiveness of flow disrupting cooling features, film cooling holes and slots in skin cooling flow passage 76b downstream of cooling slot 80.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A component for a gas turbine engine, comprising:
a component outer surface exposed to flowpath gases of the gas turbine engine;
a cooling channel disposed in the component;
at least one channel rib disposed in the cooling channel extending across the cooling channel from a channel inner surface to a channel outer surface;
a cooling slot extending from the cooling channel to a slot outlet at the component outer surface, the slot outlet having a radial width greater than an axial length; and
one or more slot teardrops extending across the cooling slot, the one or more slot teardrops located between the cooling channel and the slot outlet; wherein a turning angle of a cooling airflow flowed from the cooling channel to the cooling slot is less than 90 degrees.

2. The component of claim 1, further comprising a slot teardrop extending across the cooling slot from a slot inner surface to a slot outer surface.

3. The component of claim 1, further comprising two or more cooling channels disposed in the component.

4. The component of claim 3, wherein the slot outlet radial width spans the two or more cooling channels.

5. The component of claim 1, further comprising two or more channel ribs disposed in the component.

6. The component of claim 5, wherein the slot outlet radial width spans the two of more channel ribs.

7. The component of claim 1, wherein the component is one of a turbine vane, a turbine blade or a blade outer air seal.

8. The component of claim 1, wherein the cooling channel is a skin cooling flow passage.

9. A turbine vane for a gas turbine engine, comprising:
a vane outer surface exposed to flowpath gases of the gas turbine engine;
a cooling channel disposed in the turbine vane;
at least one channel rib disposed in the cooling channel extending across the cooling channel from a channel inner surface to a channel outer surface;
a cooling slot extending from the cooling channel to a slot outlet at the component outer surface, the slot outlet having a radial width greater than an axial length; and
one or more slot teardrops extending across the cooling slot, the one or more slot teardrops located between the cooling channel and the slot outlet;
wherein a turning angle of a cooling airflow flowed from the cooling channel to the cooling slot is less than 90 degrees.

10. The turbine vane of claim 9, further comprising a slot teardrop extending across the cooling slot from a slot inner surface to a slot outer surface.

11. The turbine vane of claim 9, further comprising two or more cooling channels disposed in the turbine vane.

12. The turbine vane of claim 11, wherein the slot outlet radial width spans the two or more cooling channels.

13. The turbine vane of claim 9, further comprising two or more channel ribs disposed in the turbine vane.

14. The turbine vane of claim 13, wherein the slot outlet radial width spans the two of more channel ribs.

15. The turbine vane of claim 9, wherein the cooling channel is a skin cooling flow passage.

16. A gas turbine engine comprising:
a combustor section; and
a turbine section in flow communication with the combustor section;
one of the turbine section and the combustor section including a component including:
a component outer surface exposed to flowpath gases of the gas turbine engine;
a cooling channel disposed in the component;
at least one channel rib disposed in the cooling channel extending across the cooling channel from a channel inner surface to a channel outer surface;
a cooling slot extending from the cooling channel to a slot outlet at the component outer surface, the slot outlet having a radial width greater than an axial length; and
one or more slot teardrops extending across the cooling slot, the one or more slot teardrops located between the cooling channel and the slot outlet;
wherein a turning angle of a cooling airflow flowed from the cooling channel to the cooling slot is less than 90 degrees.

17. The gas turbine engine of claim 16, wherein the component further comprises a slot teardrop extending across the cooling slot from a slot inner surface to a slot outer surface.

18. The gas turbine engine of claim 16, further comprising two or more cooling channels disposed in the component.

19. The gas turbine engine of claim 18, wherein the slot outlet radial width spans the two or more cooling channels.

20. The gas turbine engine of claim 16, further comprising two or more channel ribs disposed in the component.

* * * * *